(12) United States Patent
Manbeck et al.

(10) Patent No.: US 7,068,838 B2
(45) Date of Patent: Jun. 27, 2006

(54) AUTOMATED COLOR CONTROL IN FILM-TO-DIGITAL TRANSFER

(75) Inventors: Kevin Manbeck, Cranston, RI (US); Donald Geman, Amherst, MA (US); Stuart Geman, Providence, RI (US); Michael N. Orton, Agoura, CA (US)

(73) Assignee: MTI Film, LLC, Providence, RI (US)

( * ) Notice: Subject to any disclaimer, the term of this patent is extended or adjusted under 35 U.S.C. 154(b) by 505 days.

(21) Appl. No.: 10/124,625

(22) Filed: Apr. 17, 2002

(65) Prior Publication Data

US 2004/0036765 A1 Feb. 26, 2004

Related U.S. Application Data

(60) Provisional application No. 60/285,561, filed on Apr. 20, 2001.

(51) Int. Cl.
*G06K 9/00* (2006.01)

(52) U.S. Cl. .................. 382/162; 382/167; 348/96; 358/522

(58) Field of Classification Search ............... 382/162, 382/167–170, 254; 345/589, 590; 348/96, 348/207.1, 207.2, 231.2; 355/40; 358/1.9, 358/302, 487, 518–522, 527, 530, 538
See application file for complete search history.

(56) References Cited

U.S. PATENT DOCUMENTS 4,685,071 A * 8/1987 Lee ........................ 382/162

4,955,067 A * 9/1990 Shimura ................... 382/132

(Continued)

OTHER PUBLICATIONS

Trahanias et al. ("Color Image Enhancement through 3-D Histogram Equalizaiton," Proc. 11th IAPR Int'l Conf., vol. 3, Aug. 30-Sep. 3, 1992, pp. 545-548).*

(Continued)

*Primary Examiner*—Jingge Wu
*Assistant Examiner*—Yubin Hung
(74) *Attorney, Agent, or Firm*—Bromberg & Sunstein LLP

(57) ABSTRACT

A system and method for automatically adjusting color parameters during a film-to-digital transfer. An operator uses standard telecine equipment to preview scenes in order to determine a natural clustering of fields or scenes. Each cluster is processed separately. All the fields in a cluster are treated as one unit in the sense that color adjustments for the cluster are based on the cluster color histogram, which is computed by aggregating the colors from all pixels in the cluster. Constraints are specified for the cluster. Variables of a constraint may be automatically specified or determined by an operator based on observing sample frames from the cluster. In addition, the operator can nullify a constraint if desired. Within each cluster, the system adjusts red, green and blue intensities of the digitizing device, gains for each of these color channels, and other parameters. The system first determines which settings respect the constraints and then optimizes the solution. The solution is optimized such that the digital color distribution is as faithful as possible to the film color distribution subject to the constraints. This is achieved by adjusting the settings to maximize the entropy of the empirical, digital color histogram among all settings respecting the constraints.

26 Claims, 5 Drawing Sheets

U.S. PATENT DOCUMENTS

| | | | | |
|---|---|---|---|---|
| 5,113,367 A | * | 5/1992 | Marrian et al. | 708/813 |
| 5,175,804 A | * | 12/1992 | Wittmann | 358/1.8 |
| 5,943,090 A | * | 8/1999 | Eiberger et al. | 348/97 |
| 5,987,155 A | * | 11/1999 | Dunn et al. | 382/116 |
| 6,262,810 B1 | * | 7/2001 | Bloomer | 358/1.9 |
| 6,636,648 B1 | * | 10/2003 | Loui et al. | 382/284 |
| 6,728,428 B1 | * | 4/2004 | Kinjo | 382/309 |
| 6,744,848 B1 | * | 6/2004 | Stanton et al. | 378/55 |
| 6,791,712 B1 | * | 9/2004 | Gerrits | 358/1.9 |
| 2002/0118883 A1 | * | 8/2002 | Bhatt | 382/224 |

OTHER PUBLICATIONS

Rosenfeld et al., Digital Image Processing, $2^{nd}$ ed., vol. 1, 1982, pp. 231-237.*

Trahanias et al. ("Color Image Enhancement through 3-D Histogram Equalization," Proc. 11th IAPR Int'l Conf., vol. 3, Aug. 30-Sep. 3, 1992, pp. 545-548)—Previously provided.*

* cited by examiner

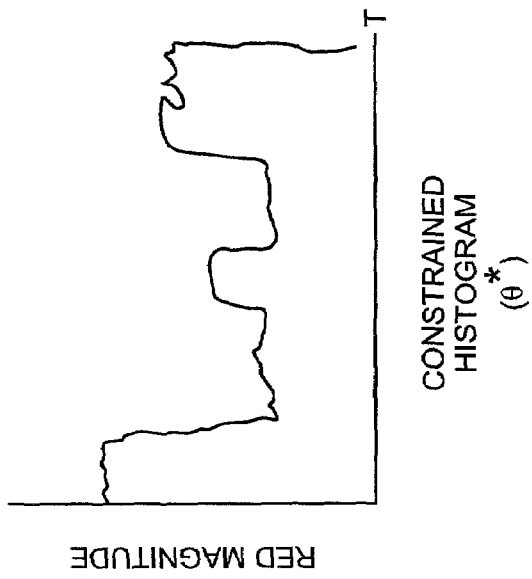
FIG. 3B CONSTRAINED HISTOGRAM ($\theta^*$)
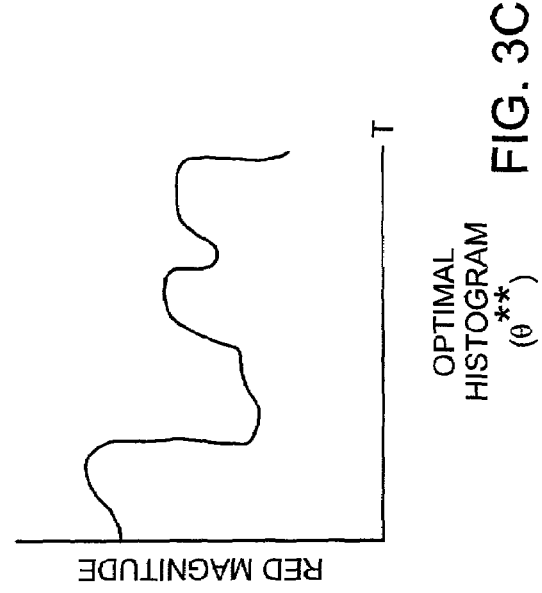
FIG. 3C OPTIMAL HISTOGRAM ($\theta^{**}$)
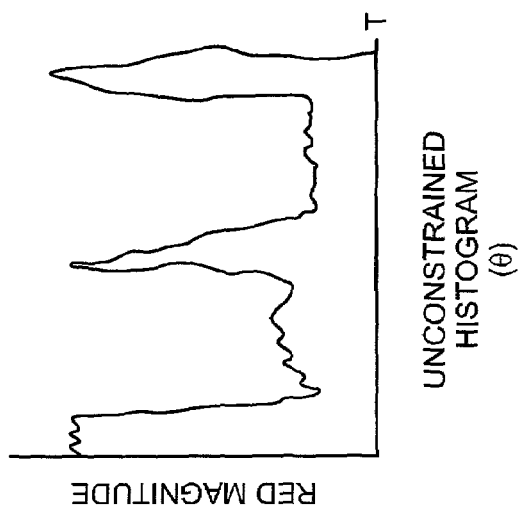
FIG. 3A UNCONSTRAINED HISTOGRAM ($\theta$)

AUTOMATED COLOR CONTROL IN FILM-TO-DIGITAL TRANSFER

PRIORITY

The present application claims priority from U.S. Provisional patent application No. 60/285,561 filed on Apr. 20, 2001, entitled "Automated Color Control in Film-to-Digital Transfer" which is incorporated by reference herein in its entirety.

BACKGROUND OF THE INVENTION

Film is commonly digitized and transferred either to digital tape or to a computer disk. Once the film is placed in digital form it may undergo additional processing such as color correction, standards conversions, nonlinear editing, "panning and scanning," compression, and/or various forms of digital filtering.

In the process of correcting the color, the distribution of colors in the film representation are balanced against the visual appearance that the colors have when displayed on a display device. Some of the desired attributes take into account perceptual properties of the human visual system. Certain relationships among color components must be preserved so that, for example, "blacks appear black," "whites appear white" and color tinted flesh tones appear natural. The corresponding relationships between color distributions and display devices are well-known to experts. For example, it is known how red, green and blue should be mixed in order to look "black" on a given monitor, or to have the appearance of flesh.

The transfer from film to digital format is controllable through various settings on a digitization device which affect the intensities and other properties of the color components. The settings control for "lift", "gamma," "gain" and other standard parameters, are implemented digitally from what is recorded to what is output. Some digitization devices allow for the control of the exposure time of each color channel, thereby effectively adjusting the three intensities. Although the details may differ from one device to another (corresponding to a different way of imaging the film), the effects of adjusting the parameters can be observed both mathematically by examining the color histogram and visually by watching the video on standard monitors. In all current systems, an operator supervises the transfer, determines the proper settings for the variables, and is ready to make adjustments as may be needed because of changing characteristics of the material. In particular, current systems are not automated.

SUMMARY OF THE INVENTION

A system for automatically adjusting intensity, gain and other color parameters during a film-to-digital transfer is disclosed. The system can operate in a range of modes from fully automatic to fully interactive. The system collects statistics on the distribution of color intensities in digitized film/video and automatically computes adjustments to the color intensity, gain and other settings in order that the visual appearance of the digital representation accommodates standard constraints on colors and color relationships. These constraints may be determined automatically or in conjunction with an operator. Among these constraints are that "blacks appear black" and "whites appear white," that "clipping" and "banding" are limited, and that there is proper "color balance." It should be understood that many other constraints may be defined for an image or a cluster (group of images) and that the constraints which are mentioned are only exemplary. A method for specifying and determining the optimal control setting subject to the assembled constraints, namely the overall control setting which maximizes the information content of the observed color distribution is also disclosed.

An operator uses standard telecine equipment to preview scenes in order to determine a natural clustering of fields or scenes. Each cluster is processed separately. All the fields in a cluster are treated as one unit in the sense that color adjustments for the cluster are based on the cluster color histogram, which is computed by aggregating the colors from all pixels in the cluster. Constraints are specified for the cluster variables of a constraint may be automatically specified or determined by an operator based on observing sample frames from the cluster. In addition, the operator can nullify a constraint if desired. Within each cluster, the system adjusts red, green and blue intensities of the digitizing device, gains for each of these color channels, and other parameters. The system first determines which settings respect the constraints and then optimizes the solution. The solution is optimized such that the digital color distribution is as faithful as possible to the film color distribution subject to the constraints. This is achieved by adjusting the settings to maximize the entropy of the empirical, digital color histogram among all settings respecting the constraints.

Once the settings for a given cluster are determined, the film-to-digital transfer begins. The results of the ongoing transfer are tracked, checking that the current settings are adequate to continue to achieve good color balance, good contrast and good dynamic range. Settings are adjusted, scene by scene, as needed.

BRIEF DESCRIPTION OF THE DRAWINGS

The foregoing features of the invention will be more readily understood by reference to the following detailed description, taken with reference to the accompanying drawings, in which:

FIG. 3A shows a color histogram for film data which has been transferred to digital form but has not been color corrected;

FIG. 3B shows a color histogram for digital video which has been color corrected by a set of control settings which meets all constraints but is non optimal;

FIG. 3C shows a color histogram for digital video which has been color corrected by a set of control settings which meets all constraints and is an optimal solution exhibiting maximum entropy;

DETAILED DESCRIPTION

It should be understood by one of ordinary skill in the art that film is composed of frames which are whole images while digital video is generally composed of fields which are one half of a whole film image. Video fields are either designated as odd or even corresponding to the lines of an image frame which are represented by the field. Digital video may also be composed of frames representing a whole image from a film frame. The term "frame" as used herein shall apply to both complete images and also to interlaced image fields. The term "cluster" as used herein refers to one or more frames (film/video). Generally a cluster is a group of frames which compose a scene or a group of scenes from a film. Clusters can be designated by an operator or may be automatically determined. The term "color information" shall refer to the digital data that is associated with color. For example R,G,B values for a pixel, field, frame or cluster. The term "color parameter" includes but is not limited to hue, saturation, and brightness. The term "control setting" as used herein refers to an arrangement of one or more color controls wherein each control sets a particular color parameter. A control setting causes color information from one or more film frames to be altered. For example, a control setting may include a brightness level, a hue level, and a saturation level and will alter the R,G,B color information.

It should be understood by one of ordinary skill in the art that color may be represented in any of a number of color spaces such as Munsell, Ostwald, CIE, RGB, and YUV for example and the invention as disclosed is not limited to any particular color space. Throughout this disclosure it is assumed that the intended display mechanism for the digital video is fixed such that any variations between displays is no longer a variable.

Figure 1:
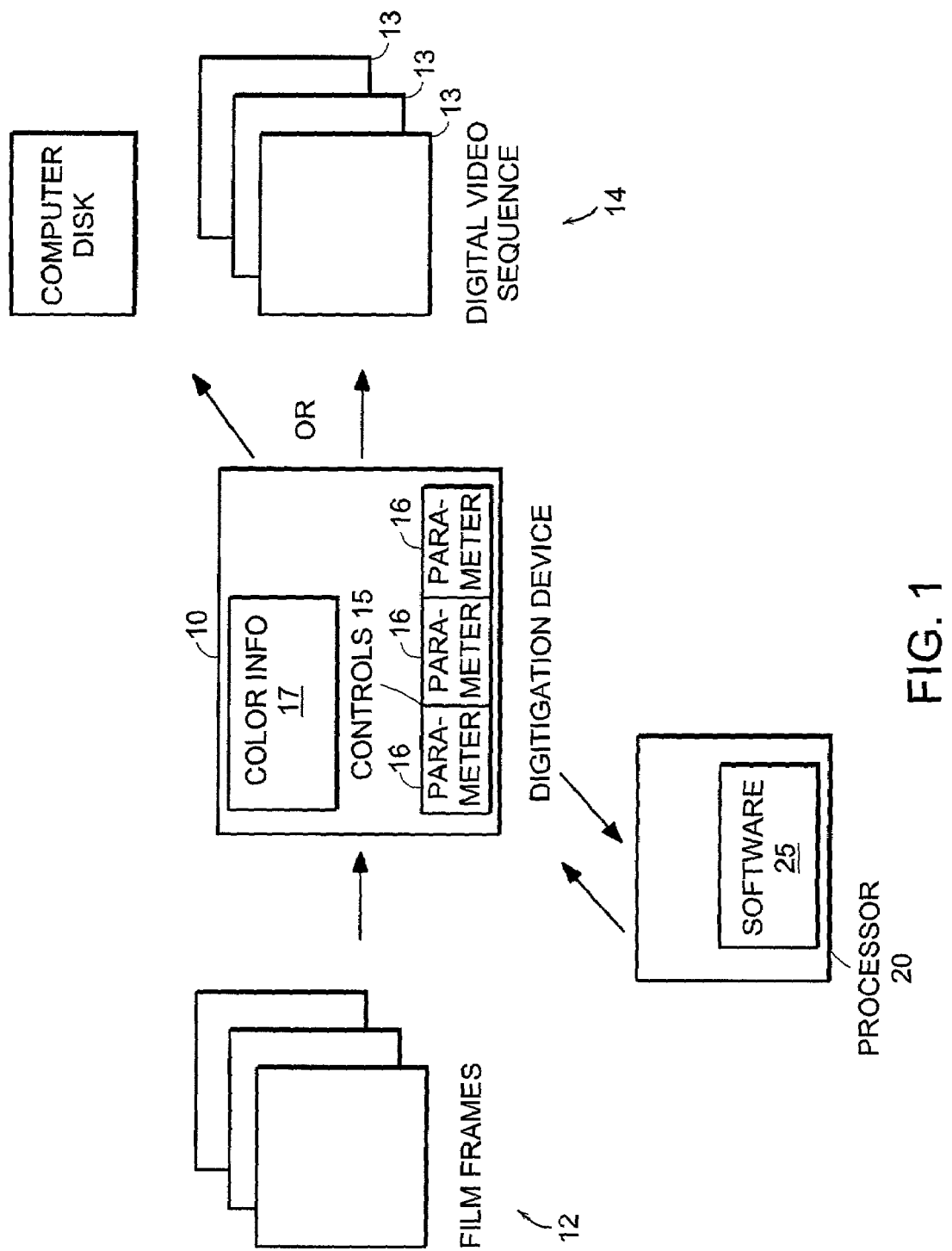
FIG. 1 is a block diagram showing an exemplary system for automating color correction functions.

A system for color correction during a film-to-digital transfer is shown in FIG. 1. The system includes a digitization device 10 for receiving as input film frames 12 and outputting a digital video sequence 14 composed of video fields or frames 13. The digitization device 10 samples the film and quantizes the color samples. In other embodiments, the digitization device receives a digital sample of the film and provides a mechanism for color correction. The digitization device is provided with adjustable controls 15 for changing color parameters 16 which adjusts the color information 17 in the digital representation and as a result the visual appearance in any particular display mechanism. For example, each color may have an associated control 15 for independent adjustment, such that in an R,G,B color space all of the red values may be increased or decreased. Similarly controls may alter groups of colors such that the hue, saturation or brightness may be changed. For example, the brightness at high intensities can be adjusted to prevent "ballooning" and to get "soft clipping," whereas brightness at low intensities can be adjusted to get sufficient detail in the dark areas of an image or a cluster. Each possible control setting of these controls leads to a different color distribution of the color information for a cluster of frames.

A processor 20 executing software 25 interacts with the digitization device for adjusting the color parameters 16 for a control setting 15 of the digitization device for the video transfer. Although the following description shall refer to software, it should be understood by one of ordinary skill in the art that the software may be embodied on an integrated circuit or may be a combination of computer code and hardware. The software can be set to adjust the colors of a cluster of film frames either automatically or semi-automatically with input from a human operator. The software insures that conventional requirements on the distribution of color information within each cluster of video frames are satisfied while at the same time preserving information from the original distribution of colors.

The problem of color correction is formulated in the context of constrained optimization. The conventional requirements on the distribution of colors will be referred to as "constraints". The constraints are dependent on the display mechanism for the digital video representation. Typical examples of constraints are "blacks should look black," "whites should appear white," and the overall average of the color channels should be "gray." A further constraint is that human skin should look like flesh. Other possible constraints are that there should be limited "banding" and "clipping" in the dark and light areas of a video image when it is displayed on a display device. Some constraints are most naturally addressed in the RGB color space, whereas other constraints may be better addressed in other color spaces. The software is therefore provided with the ability to change between color spaces. For example, some of the color fidelity issues referred to below are generally address in "$C_b/C_r$ color space", referring to a color coordinate system based on a luminance or intensity variable $Y=\rho R+\gamma G+\beta B$ where R, G, B stand for red, green and blue, and $\rho$, $\gamma$, $\beta$, are positive parameters with $\rho+\gamma+\beta=1$. The other two components in this representation are $C_b=Y-B$ and $C_y=Y-R$. Thus $C_b/C_r$ space is simply a linear transformation of R, G, B-space.

Figure 2A:
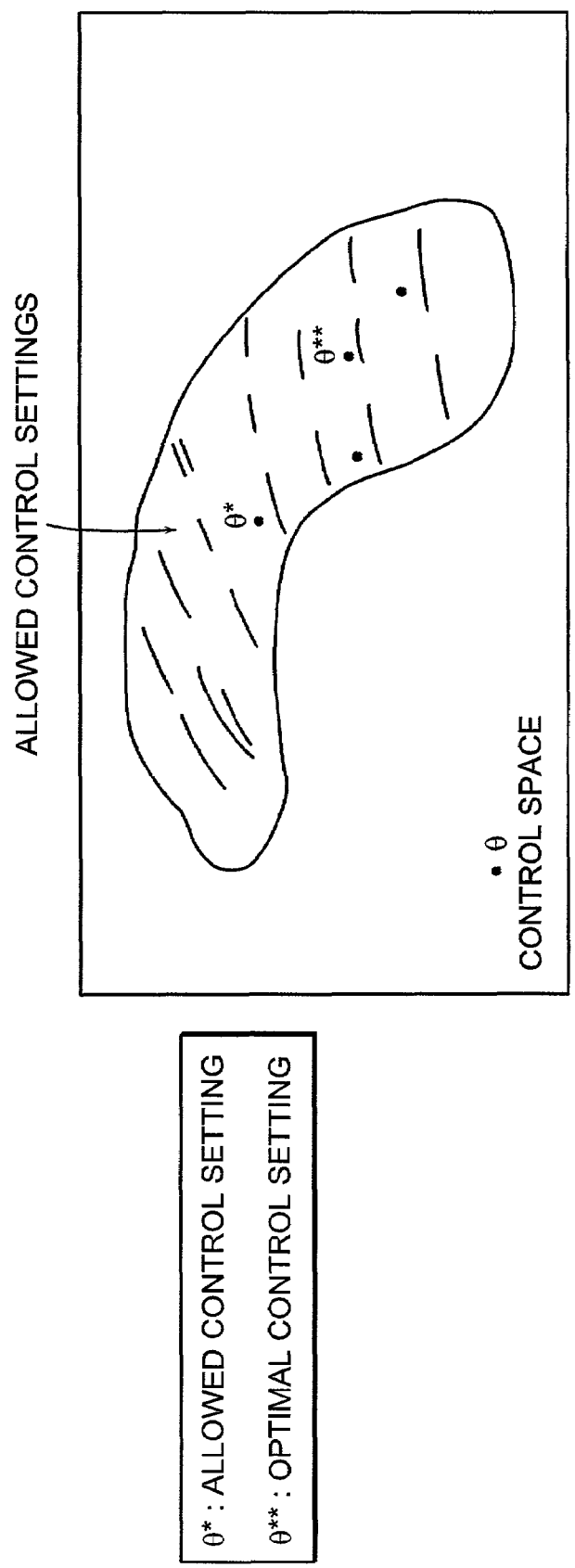
FIG. 2A is a spatial representation showing all allowable control settings which is designated as the control space and a subset of settings labeled allowed settings which meet constraint criteria.

FIG. 2A shows a 2-D control space along with possible control settings within the control space wherein each control setting is indicated with a Θ. Each constraint may be represented as a property of an empirical three-dimensional histogram of colors related to the totality of pixels in the corresponding sequence, which constitutes the cluster. Some control settings yield a histogram which comply with the constraints, and some do not. The control settings which are within the space of all constraints are represented with a Θ* while the optimum setting is marked with a Θ. The method for determining Θ will be explained below. FIG. 3A shows a representative 2-dimensional version of the 3-D histogram wherein only one color component is represented, which in this example is the color component red. This histogram represents the sampled color information from a cluster of frames prior to being altered by changes in the control settings of the digitization device.

FIGS. 3B–3C show altered 2-D color histograms of the histogram displayed in FIG. 3A. FIG. 3B shows a histogram wherein the control settings are changed thereby altering the histogram. The settings used to produce the color information of FIG. 3B comply with all of the constraints and therefore would reside within the shaded portion of the color space representation of FIG. 2A. FIG. 3C is also a histogram which contains altered color information which complies with all of the constraints and represents the optimal solution Θ** from FIG. 2A.

Figure 4:
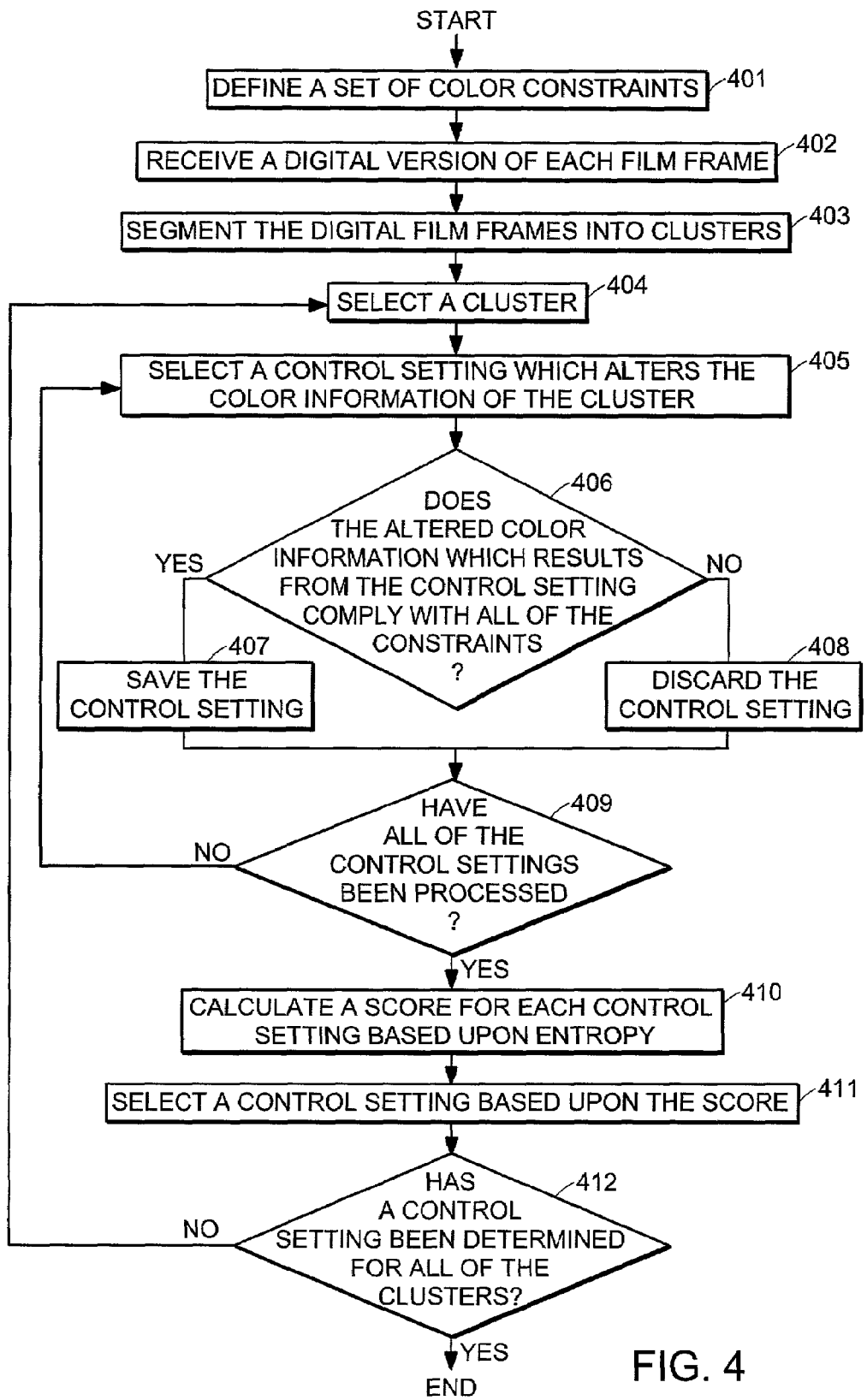
FIG. 4 is a flow chart of the steps for color control in film to digital video transfers.

Among the settings that respect the constraints, a method is defined for ordering the solutions and therefore finding an optimal setting in the sense of sharing as much information as possible with the distribution of colors in the film representation. FIG. 4 is a flow chart showing the steps used to determine such a control setting. First a set of constraints are determined (Step 401). Each constraint is a function which depends upon the color information. The constraints are defined by one or more variables which may be either set by an operator or automatically set within the constraint function. If the variables are automatically set this step may be bypassed. The constraints as well as the extent of automation of the constraints may be cluster-dependent.

A first constraint is color fidelity. Black regions in the original film representation should also look black (when the digital material is displayed), white regions should look white, flesh tones should appear natural. All of these constraints are based upon human perception. The corresponding quantitative constraint on the color distribution can be determined either automatically, for instance by identifying peaks near actual black (in a 3D color histogram of the color information) and requiring that the colors of the corresponding pixels be black, or with the assistance of an operator manually specifying a spatial region in one or more frames in the cluster that needs to look black. In the purely automated case, a constraint might be that a certain percentage of pixels for a cluster must be at full black (R,G,B,=0, 0,0), for instance 10% of all pixels.

In another variation which includes operator input, an operator could adjust the percentage variable for the constraint.

The second constraint is balance, such that the overall mean of the empirical color distribution of the color information associated with the cluster should be gray. This implies that the average color of all the pixels in the cluster should lie on the diagonal (R=G=B) in the three-dimensional color space. In an automated version the particular level of gray would be automatically chosen. In a semi-automatic mode of operation, the particular level of grey might be specified by the operator.

Avoidance of clipping is another constraint. Clipping occurs when a large number of pixels, usually very dark or very light, are assigned the same quantization level in the color histogram. This results from the quantization problem wherein shades between two colors must be associated with one of the two colors. Clipping is detected by searching for certain peaks in the histogram which are indicative of clipping. Such peaks normally occur at high or low light intensity levels and appear as a line on the histogram. Such lines in the histogram usually indicate that too much detail has been lost in the quantization process from the high resolution of film to the lower resolution of digital video. The software can search for the slope of the line between pixel points having high or low light intensity levels to determine if clipping is occurring. One method of implementing the constraint is to identify a minimum slope in a set number of directions from a pixel for compliance.

Another constraint is the noise level of the color information. Noise occurs when similar exposure values from the film get mapped to very different color information values. Like the banding problem, noise is reflected in the shape of the color histogram, in this case, by gaps in the dark areas which indicate that similar values on the film have been mapped by the settings to very different values in the video realm. The corresponding constraint refers to the absence of such gaps. The constraint may be defined by a difference measurement in color between neighboring groups of pixels, such that if the difference measurement exceeds a threshold the constraint is complied with.

Clipping, banding and noise are relatively more objectionable in dark regions than in bright ones because the eye is more sensitive to detail in dark areas. Therefore, the constraints may be defined to be more sensitive for a certain black level. Taking into account one or more of such phenomena leads finally to a series of constraints on the color histogram.

A digitized version of each film frame is either created through an A/D conversion in a digitization device or a digitized version is imported which includes the color information (Step 402). The digital film is then segmented into clusters which may contain one or more frames (Step 403). The cluster may be manually selected by a human operator of the digitization device or the cluster may be automatically created based upon characteristics of the digital information as is known to one of ordinary skill in the art. In other embodiments, the film frames may be divided into clusters prior to conversion to the digital domain. Further, it should be understood that the constraints may be defined after the clusters are determined and in some embodiments in which the constraints are cluster dependent this is the preferred sequence of steps.

A cluster is then selected for processing (Step 404). Controls of the digitization device are then automatically set to a first setting of a plurality of possible settings which alters the color information for the cluster (Step 405). It should be understood by one of ordinary skill in the art that the changes to the control settings may be done within a processor which is located within the digitization device. Further, it should be understood that the number of control settings cannot be an infinite number for a practical implementation. As a result, the control space having control settings must be limited to a finite number of values. For instance, gain may have a scale from 0–1.0 which potentially has an infinite number of levels however the parameter may be defined in 0.001 increments such that there are 1000 finite levels. Similarly, this would hold true for all color parameters that make up a single control setting.

The adjusted color information is then analyzed to see if it complies with all of the constraints (Step 406). If the color information of the control setting does comply with all of the constraints then the control setting is saved (Step 407). If the color information does not comply with all of the constraints the control setting is discarded (Step 408) This process is continued iteratively until all of the possible settings which comply with the constraints are identified (Step 409).

More specifically, let $F_1, F_2, \ldots, F_N$ denote the video frames corresponding to a cluster, and consider a standard red, green, blue color representation so that $F_n = (F_{n,r}, F_{n,g}, F_{n,b})$, where in turn each of the three components is a mapping from a lattice of pixels 1 to a range of intensity values, for example $\{0, 1, \ldots, 255\}$ ("8 bit quantization") or $\{0, 1, \ldots, 1023\}$ ("10 bit quantization"). Suppose the lattice f is of dimension L×W. and let hist (r, g, b) represent the color histogram derived from the cluster. The histogram is based on N×L×W color samples and defined, for each color point (r, g, b) in $\{0, 1 \ldots 2^B - 1\}^3$, where B is the number of bits in each color channel, as follows:

$$hist(r,g,b) = (NLW)^{-1} \#\{(n,x,y) \in \{1,2,\ldots,N\} \times l: F_n(x,y) = (r,g,b)\}$$

wherein #{A} indicates the number of elements in the set A.

Let $\Theta$ represent the possible range of settings on the digitization device. Thus each $\theta \in \Theta$ corresponds to one control setting. Each such setting $\theta$ then determines a potentially different histogram. The dependence on $\theta$ will be denoted by writing hist(r,g,b;$\theta$). The constraints determine a subset of settings, namely those for which hist(r,g,b;$\theta$) displays the desired properties. Let $\Theta_C \subset \Theta$ denote the collection of control settings which comply with the constraints.

A score is then calculated for the control setting. (Step 410) The score is determined based upon the Shannon entropy of the color information. The entropy provides the mutual information between the distribution of color in the and the digital representations subject to the constraints. This is true since each control setting may be regarded as a perturbation or quantization of the possible values of the film color, and hence as a function Y=g(X) where the random variable X represents the original color information at a randomly chosen pixel. The distribution of X is dependent on the film content and after quantization the number of possible values is reduced to a finite number. The maximization of the mutual information between X and Y is a quantization of original color values which produces a video color histogram sharing as much information as possible with the distribution of colors in the film representation. The optimal control setting is equivalent to the setting which maximizes the entropy of Y among all allowable control settings. This can be shown by:

I(X,Y)=H(Y)−H(Y|X) where H(Y|X) is the conditional entropy of Y given X. Since Y is a function of X, the conditional entropy of Y given X is zero i.e. H(Y|X)=0. Consequently, maximizing the mutual information over all functions g is the same as maximizing the entropy H(g(X)) over all g. The entropy of g(X) depends only on the statistical distribution of g(X), which in turn depends only on the particular function (control setting) g since the distribution of X is fixed and needn't be explicitly considered.

For each $\theta \in \Theta$, the entropy of hist(r,g,b;$\theta$) is $$H(\theta) = -\sum_{r,g,b} hist(r, g, b; \theta) \log hist(r, g, b; \theta)$$

where the sum runs all $2^{3B}$ allowable (r,g,b) values and log represents log base 2.

The process repeats until all of the settings complying with the constraints have assigned scores based upon the entropy of the color information for the cluster. An optimal setting is then determined. Optimality is determined based upon the control setting with the highest score. The optimal setting is defined to be the one setting which satisfies the constraints which maximizes the Shannon entropy. The optimal $\theta^*$ is then defined by $$\theta^* = \underset{\theta \in \Theta_C}{\operatorname{argmax}} H(\theta).$$

The corresponding histogram hist(r,g,b;$\theta^*$) then represents the digital representation which best matches the film representation subject to the constraints.

The setting which provides the optimal score is preferably selected, although any setting, may be chosen which satisfies all of the constraints (Step 411). This process continues until a control setting is chosen for all of the clusters (Step 412). Preferably the optimal control setting is selected for all clusters, although control settings which comply with all of the constraints may also be selected. To find the optimal control setting, optimization techniques which are known in the art may be employed, such as global optimization. When certain constraints do not provide a linear mapping, other optimization techniques, such as, gradient methods or sub-optimal solutions, such as maximizing the score over a subset of control settings may be employed. It should be understood by one of ordinary skill in the art that wide variety of optimization techniques may be employed depending on the constraint functions. The method thus adjusts the settings in order to maximize the entropy of the color histogram, but confining the search over settings to those which implement the constraints.

Figure 5:
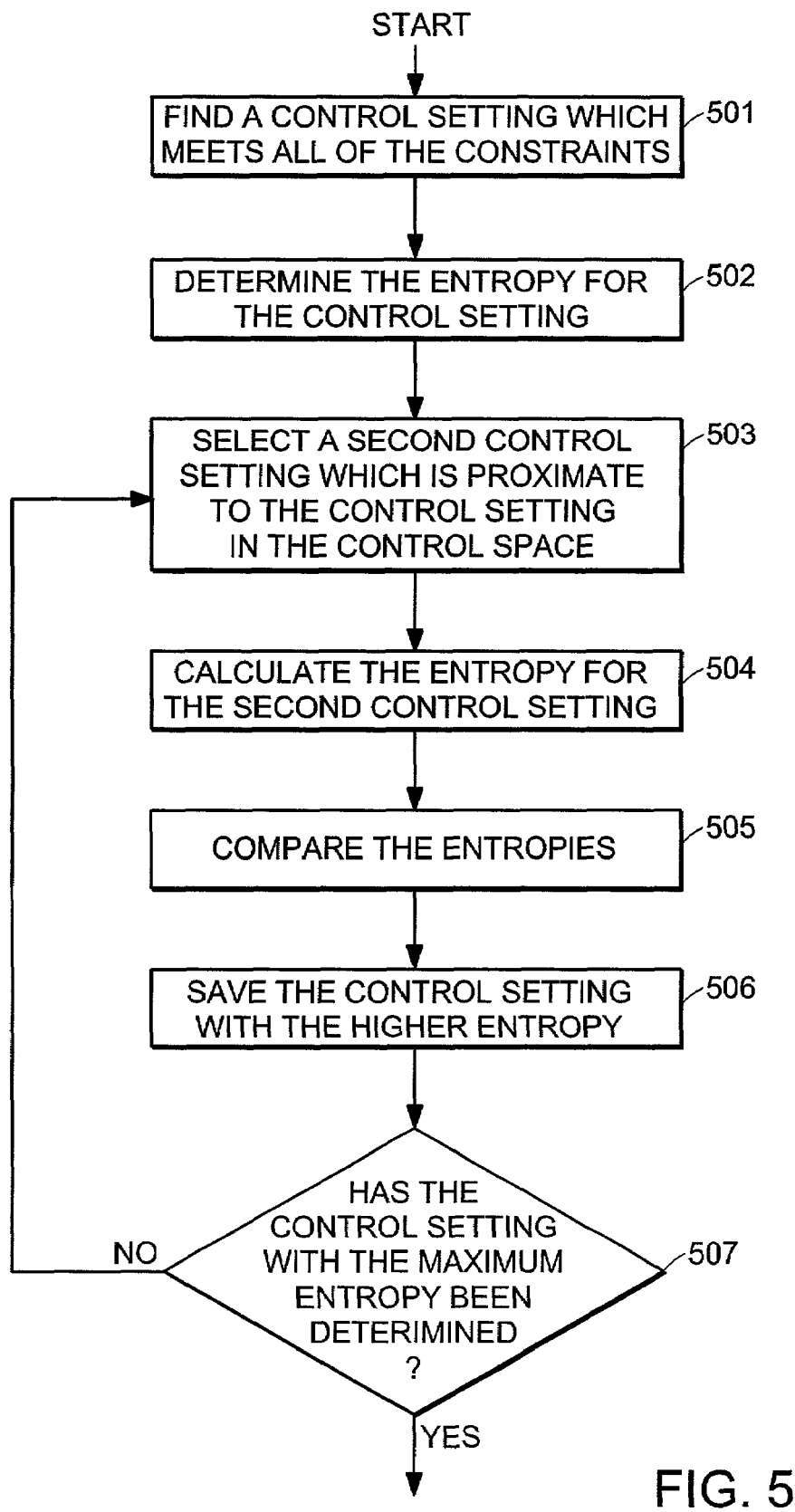
FIG. 5 is a flow chart of the steps for color control in an alternative embodiment.

In another embodiment as shown in FIG. 5, the method for determining the optimal control setting is determined by first iteratively processing control settings until a control setting is found which meets all of the constraints (Step 501). Next, the entropy of that control setting is determined as expressed above (Step 502). Another set of control settings, proximate to the original set of control settings in the control space is then selected (Step 503). The entropy is calculated for the proximate settings. (Step 504). The entropy values are then compared. (Step 505). The control setting with the greater entropy is selected and saved. (Step 506). The process repeats to Step 503 wherein another proximate control setting is selected from the control space. This process iteratively continues until the control setting in the control space which exhibits the maximum entropy is found (Step 507). Computer code for searching for a maximum value is well known in the art and may be accomplished using many well known techniques.

In an alternative embodiment, the disclosed apparatus and method for automated color control may be implemented as a computer program product for use with a computer system including digitization devices. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method for automated color control in converting film to digital video, the method comprising:
   receiving a digital video stream composed of a plurality of video frames, the plurality of video frames converted from film;
   partitioning the frames into a plurality of clusters, wherein at least one cluster contains a plurality of video frames and each cluster has an associated color distribution;
   automatically determining at least one modified color distribution for each cluster of digital video which complies with one or more color constraints for the cluster, the color constraints are evaluated on the color distribution of the cluster as a whole.

2. The method according to claim 1 wherein there are a plurality of color constraints, the method further comprising:
iteratively processing possible color distributions to identify any distributions which comply with all of the constraints.

3. The method according to claim 2 further comprising:
grading the color distributions according to entropy.

4. The method according to claim 3 further comprising:
selecting the color distribution which has the maximum entropy.

5. A method for automated color control in converting film to digital video, the film being composed of frames containing color information defining one or more scenes the method comprising:
converting the film frames into digital video frames;
grouping the digital video frames into one or more clusters by scene;
automatically determining altered color information for each cluster, wherein the altered color information complies with one or more color constraints, the color constraints are evaluated on the color information of the cluster as a whole and the altered color information for the cluster contains substantially the same color information as the film scene.

6. The method according to claim 5 wherein the altered color information for each cluster is optimized such that the altered color information shares the maximum color information with the film scene subject to compliance with all color constraints.

7. The method of claim 5 wherein the specified constraints include at least one of color fidelity, balance, absence of clipping, absence of banding and noise removal.

8. The method of claim 5 wherein determining altered color information comprises adjusting color settings for a digitization device to maximize the entropy for the color setting.

9. The method of claim 8 wherein adjusting the color settings comprises:
calculating the entropy of the altered color information for each color setting; and
selecting the color setting which satisfies the constraints and maximizes the entropy.

10. The method of claim 9 wherein the color settings comprise at least one of lift, gamma and gain.

11. The method of claim 8 further comprising:
transferring the altered color information corresponding to the selected color setting to a digital medium.

12. The method of claim 11 wherein the digital medium is digital tape.

13. The method of claim 11 wherein the digital medium is a computer disk.

14. A system for automated color control in converting film to digital video, the system comprising:
a digitization device for converting frames of the film into digital video;
means for partitioning the frames into a plurality of clusters, wherein at least one cluster includes a plurality of frames;
means for specifying constraints for each cluster, the color constraints are evaluated on the color information of the cluster as a whole; and
means for optimizing the color information in each cluster of digital video, wherein the optimized color information is as close as possible to the color information in the film subject to the constraints.

15. The system of claim 14 wherein the constraints comprise at least one of color fidelity, balance, absence of clipping, absence of banding and noise removal.

16. The system of claim 14 wherein the means for optimizing adjusts the color settings for each cluster to maximize the entropy among all possible color settings which respect the color constraints.

17. The system of claim 14 wherein in adjusting the color settings the means for optimizing:
calculates the entropy for each possible color setting complying with the color constraints; and
selects the color setting which satisfies the constraints and maximizes the entropy.

18. The system of claim 17 wherein the color settings comprise at least one of lift, gamma and gain.

19. The system of claim 14 wherein the digitization device:
transfers the color information to a digital medium.

20. The method of claim 19 wherein the digital medium is digital tape.

21. The method of claim 19 wherein the digital medium is a computer disk.

22. A system for automated color control in converting film to digital video, the system comprising:
a digitization device for converting frames of the film into a digital representation composed of color information; and
an optimizer for optimizing the color information in each cluster of digital video, wherein the optimized color information is as close as possible to the color distribution in the film subject to specified constraints, the color constraints are evaluated on the color information of the cluster as a whole, wherein at least one cluster contains a plurality of digital video frames.

23. The system of claim 22 wherein the constraints comprise at least one of color fidelity, balance, absence of clipping, absence of banding and noise removal.

24. The system of claim 22 wherein the optimizer adjusts the digitization device according to a color setting for each cluster to maximize the entropy among all possible color settings which comply with the constraints.

25. The system of claim 24 wherein in adjusting the optimizer:
calculates the entropy for each color setting; and
selects the color setting which satisfies the constraints and maximizes the entropy.

26. The system of claim 25 wherein the color settings comprise at least one of lift, gamma and gain.

* * * * *